US012752869B2

(12) United States Patent
Broens

(10) Patent No.: US 12,752,869 B2
(45) Date of Patent: Oct. 6, 2026

(54) FOREST MACHINE TRACK

(71) Applicant: NORDIC TRACTION OY, Loimaa (FI)

(72) Inventor: Renoldus Broens, Salo (FI)

(73) Assignee: NORDIC TRACTION OY, Loimaa (FI)

( * ) Notice: Subject to any disclaimer, the term of this patent is extended or adjusted under 35 U.S.C. 154(b) by 243 days.

(21) Appl. No.: 18/660,790

(22) Filed: May 10, 2024

(65) Prior Publication Data

US 2024/0375733 A1 Nov. 14, 2024

(30) Foreign Application Priority Data

May 11, 2023 (EP) .................................... 23172874

(51) Int. Cl.
*B62D 55/215* (2006.01)
*B62D 55/04* (2006.01)

(52) U.S. Cl.
CPC ........... *B62D 55/215* (2013.01); *B62D 55/04* (2013.01)

(58) Field of Classification Search
CPC ...... B62D 55/04; B62D 55/20; B62D 55/215; B62D 55/24; B62D 55/253
See application file for complete search history.

(56) References Cited

U.S. PATENT DOCUMENTS 1,959,337 A * 5/1934 Beasley ............... B62D 55/215 305/43
2,433,409 A * 12/1947 Brooks .................. B62D 55/04 305/195
2,455,307 A * 11/1948 Basil ...................... B62D 55/04 305/201
2,517,429 A * 8/1950 Henning ............. B62D 55/215 305/42

FOREIGN PATENT DOCUMENTS

DE 20 2014 103179 U1 7/2014
WO WO-2011004362 A1 * 1/2011 ........... B62D 55/215
WO 2019/016431 A1 1/2019
WO 2021/191505 A1 9/2021

OTHER PUBLICATIONS

European Search Report in U.S. Appl. No. 23/172,874, dated Oct. 10, 2023, 2 pages.

* cited by examiner

*Primary Examiner* — Kip T Kotter
(74) *Attorney, Agent, or Firm* — Meunier Carlin & Curfman LLC

(57) ABSTRACT

The present invention relates to a forest machine track that comprises a plurality of connecting elements having a first end and a second end, a plurality of outer tubes arranged in parallel and spaced apart from each other, and a plurality of means for storing and releasing mechanical energy, each of the plurality of means for storing and releasing mechanical energy being arranged in connection with one of the plural-
(Continued)

ity of outer tubes. In the forest machine track adjacent outer tubes are connected by two connecting elements in such a manner that the first ends of the two connecting elements are connected to one of the adjacent outer tubes and the second ends of the two connecting elements are connected to the means for storing and releasing mechanical energy in connection with the other of the adjacent outer tubes.

14 Claims, 2 Drawing Sheets

FOREST MACHINE TRACK

PRIORITY

This application claims priority to the European patent application number 23172874.2 filed on May 11, 2023.

TECHNICAL FIELD OF THE INVENTION

The present invention relates to a forest machine track according to the preamble of the appended independent claim.

BACKGROUND OF THE INVENTION

Forest machines, such as harvesters and forwarders, are usually equipped with removable tracks to improve traction and flotation. A conventional track for a forest machine comprises track plates, which are connected to each other at their ends by side links. The size of the side links is chosen according to the size of the tyres around which the track is to be installed. The side links are designed to be in essentially the same level as the rolling radius of the tyre, so that the track travels essentially the same distance as the tyre. The conventional track is provided with guides or side supports that keep the track on top of the tyres and prevent the track to get misaligned. Typically, the track does not have a tensioning system, whereby the amount and size of the track plates and side links defines the length and thus the tension of the track.

The track increases the contact area with the ground, and thus it decreases the surface pressure produced by a forest machine on the ground. By changing the size of and the distance between the track plates, the track can be optimized for different terrains. Generally, close spaced tracks with wide plates are better suited to soft terrains and wider spaced tracks with narrower plates are better suited to harder terrains and steeper slopes, offering greater climbing ability. Even if widening the track would increase the contact area and thus decrease the surface pressure, the width of the track is in practice limited by the forest machine itself, the felling site, and the regulations regarding forest machine transportation.

The surface pressure between the track and the ground is a crucial factor when considering the impact, the forest machine has to the terrain. The main factors which have effect on the magnitude of the surface pressure under the track are the machine weight, the centre of gravity, the contact area of the track, and the shape and dimensions of the bogie. The amount of track plates that are in contact with the ground in any given time varies according to the stiffness of the soil, the tension of the track and the possible deformation of the track under heavy loads.

The surface pressure is unevenly distributed under the track. The harder the soil is, the more unevenly the surface pressure is distributed. The peak values for the surface pressure are under the tyres and the shear stress is at its maximum in front of the track, where the track plates take first contact to the ground. The surface pressure has lower values between the tyres where the track forms an arch. The shape of the arch depends on the tension of the track.

A known solution to reduce the magnitude and variation of the surface pressure under the track is to use an auxiliary wheel between the tyres. The auxiliary wheel is pushed against the track with a constant or altering force, thus decreasing the pressure under the tyres and evening out the pressure distribution. A problem of the auxiliary wheel is, however, that it adds the weight and complexity of the track and is prone to damage.

Objectives of the Invention

It is the main objective of the present invention to reduce or even eliminate the prior art problems presented above.

It is an objective of the present invention to provide a forest machine track. In more detail, it is an objective of the invention to provide a forest machine track enabling to reduce the magnitude and variation of the surface pressure between the track and the ground. It is a further objective of the invention to provide a forest machine track enabling to reduce the slip between the track and the tyres around which the track is installed.

In order to realise the above-mentioned objectives, the forest machine track according to the invention is characterised by what is presented in the characterising portion of the appended independent claim. Advantageous embodiments of the invention are described in the dependent claims.

DESCRIPTION OF THE INVENTION

A forest machine track according to the invention comprises a plurality of connecting elements having a first end and a second end, a plurality of outer tubes arranged in parallel and spaced apart from each other, and a plurality of means for storing and releasing mechanical energy, each of the plurality of means for storing and releasing mechanical energy being arranged in connection with one of the plurality of outer tubes, wherein adjacent outer tubes are connected by two connecting elements in such a manner that the first ends of the two connecting elements are connected to one of the adjacent outer tubes and the second ends of the two connecting elements are connected to the means for storing and releasing mechanical energy in connection with the other of the adjacent outer tubes.

The forest machine track according to the invention is a bogie track that can be installed around two tyres of a forest machine, such as a harvester or a forwarder. The forest machine track according to the invention improves traction and flotation.

The outer tubes are connected to each other in such a manner that when the forest machine track is installed around tyres, the longitudinal axis of the outer tubes is perpendicular to the direction of motion of the forest machine track. Preferably, the outer tubes are connected to each other at their ends. The distance between the adjacent outer tubes can be, for example, 10-50 cm. The length of the outer tubes can be, for example, 30-150 cm. The outer tubes are preferably made of steel or any other iron-based alloy that is hard and strong enough.

The connecting elements are connected to the outer tubes in such a manner that the first end of each connecting element is connected to one of the outer tubes, and that to each outer tube is connected two connecting elements. Preferably, the connecting elements are connected to the ends of the outer tubes. The first ends of the connecting elements can be connected to the outer tubes by welding or by using suitable connecting means. The connecting elements are preferably elongated elements. The length of the connecting elements can be, for example, 10-50 cm. The connecting elements are preferably made of steel or any other iron-based alloy that is hard and strong enough. Preferably, the number of connecting elements is twice the number of outer tubes.

The second ends of the connecting elements are connected to the means for storing and releasing mechanical energy. The second ends of the connecting elements can be connected to the means for storing and releasing mechanical energy by welding or by using suitable connecting means. Each means for storing and releasing mechanical energy is arranged inside one of the outer tubes. The means for storing and releasing mechanical energy is such that it allows the connecting element to rotate about the longitudinal axis of the outer tube. When the connecting element rotates away from its rest position, mechanical energy is stored into the means for storing and releasing mechanical energy. The stored mechanical energy can be released from the means for storing and releasing mechanical energy to rotate the connecting element towards its rest position.

An advantage of the forest machine track according to the invention is that it enables to reduce the magnitude and variation of the surface pressure between the track and the ground. Another advantage of the forest machine track according to the invention is that it enables to reduce the slip between the track and the tyres around which the track is installed. These advantages are achieved through the self-tensioning property of the invention.

According to an embodiment of the invention the means for storing and releasing mechanical energy comprises an inner tube arranged inside the outer tube in such a manner that the inner tube can rotate about its longitudinal axis with respect to the outer tube, and at least one elastomer element arranged between the inner tube and the outer tube, wherein ends of the inner tube are connected to the second ends of the connecting elements.

When the connecting elements that are connected to the inner tube rotate the inner tube away from its rest position, mechanical energy is stored into the elastomer element(s). The stored mechanical energy can release from the elastomer element(s) to rotate the inner tube towards its rest position and thus at the same time to rotate the connecting elements that are connected to the inner tube.

The inner tube can be slightly longer than the outer tube. The inner tube can be, for example, 1-10 cm longer than the outer tube. The inner tube is preferably made of steel or any other iron-based alloy that is hard and strong enough.

The number of elastomer elements can be, for example, one, two, or four. In a case of only one elastomer element, the elastomer element is preferably arranged to fulfil essentially the whole space between the inner tube and the outer tube. The elastomer element is preferably an elongated element that is slightly shorter than the outer tube. The elastomer element can be an elastomer cord. The elastomer element can be made of, for example, natural rubber, synthetic rubber, polyurethane rubber, silicone rubber, or any other compression energy storing elastomer.

According to an embodiment of the invention the outer and inner tubes are rectangular tubes. By a rectangular tube is meant a tube having a rectangular hollow cross-section. The height and width of the rectangular tube can be, for example, 20-100 mm. Preferably, the height and the 5 width are the same, in which case the outer and inner tubes are square tubes.

According to an embodiment of the invention the inner tube is arranged inside the outer tube in such a manner that at a rest position the inner tube is at an angle of between 35 and 55 degrees relative to the outer tube. At the rest position the inner tube is preferably at an angle of between 40 and 50 degrees and more preferably at an angle of between 43 and 47 degrees relative to the outer tube.

According to an embodiment of the invention the connecting element has a first opening at its first end, through which first opening the end of the inner tube is arranged to extend. An end of the at least one elastomer element can also be arranged to extend through the first opening of the connecting element. The end of the inner tube that is arranged through the first opening of the connecting element is connected to the second end of another connecting element.

According to an embodiment of the invention the connecting element has a second opening at its second end, through which second opening the end of the inner tube is arranged to extend. The second opening is preferably dimensioned according to the inner tube so that the end of the inner tube fits firmly in the second opening of the connecting element. The inner tube can be connected to the connecting element by using a pin that is arranged into a transverse through-hole provided in the end of the inner tube.

According to an embodiment of the invention the first and/or second openings are rectangular-shaped. Preferably, the first and/or second openings are square-shaped.

According to an embodiment of the invention the means for storing and releasing mechanical energy comprises a first torsion bar and a second torsion bar arranged side by side inside the outer tube, wherein opposite ends of the first torsion bar and the second torsion bar are connected to the second ends of the connecting elements.

When the connecting element that is connected to the first or the second torsion bar rotates the torsion bar away from its rest position, mechanical energy is stored into the torsion bar. The stored mechanical energy can release from the torsion bar to rotate the connecting element in an opposite direction.

The first and the second torsion bar have preferably the same length as the outer tube. The length of the first and the second torsion bar can be, for example, 30-150 cm. The diameter of the first and the second torsion bar can be, for example, 5-30 mm. The first and the second torsion bar are preferably made of an iron-based alloy.

According to an embodiment of the invention the connecting element has a first opening at its first end, through which first opening the end of the first torsion bar or the second torsion bar is arranged to extend. The end of the torsion bar that is arranged through the first opening of the connecting element is connected to the second end of another connecting element.

According to an embodiment of the invention the connecting element has a second opening at its second end, through which second opening the end of the first torsion bar or the second torsion bar is arranged to extend. The second opening is preferably dimensioned according to the torsion bar so that the end of the torsion bar fits firmly in the second opening of the connecting element. The torsion bar can be connected to the connecting element by using a pin that is arranged into a transverse through-hole provided in the end of the torsion bar.

According to an embodiment of the invention the means for storing and releasing mechanical energy comprises a first coil spring and a second coil spring arranged sequentially inside the outer tube, wherein distal ends of the first coil spring and the second coil spring are connected to the second ends of the connecting elements. The other ends of the first coil and the second coil can be connected to each other or to a centre element that connects the first coil and the second coil together.

When the connecting element that is connected to the first or the second coil spring rotates the coil spring away from its rest position, mechanical energy is stored into the coil spring. The stored mechanical energy can release from the coil spring to rotate the connecting element in an opposite direction.

The first and the second coil spring have preferably half of the length of the outer tube. The length of the first and the second coil spring can be, for example, 15-75 cm. The first and the second coil spring are preferably made of an iron-based alloy, such as spring steel.

According to an embodiment of the invention the connecting element has a first opening at its first end, through which first opening the end of the first coil spring or the second coil spring is arranged to extend. The end of the coil spring that is arranged through the first opening of the connecting element is connected to the second end of another connecting element.

According to an embodiment of the invention the connecting element has a second opening at its second end, through which second opening the end of the first coil spring or the second coil spring is arranged to extend. The second opening is preferably dimensioned according to the coil spring so that the end of the coil spring fits firmly in the second opening of the connecting element. The coil spring can be connected to the connecting element by using a pin that is arranged into a transverse through-hole provided in the end of the coil spring.

The exemplary embodiments of the invention presented in this text are not interpreted to pose limitations to the applicability of the appended claims. The verb "to comprise" is used in this text as an open limitation that does not exclude the existence of also unrecited features. The features recited in the dependent claims are mutually freely combinable unless otherwise explicitly stated.

DETAILED DESCRIPTION OF THE DRAWINGS

Figure 1:
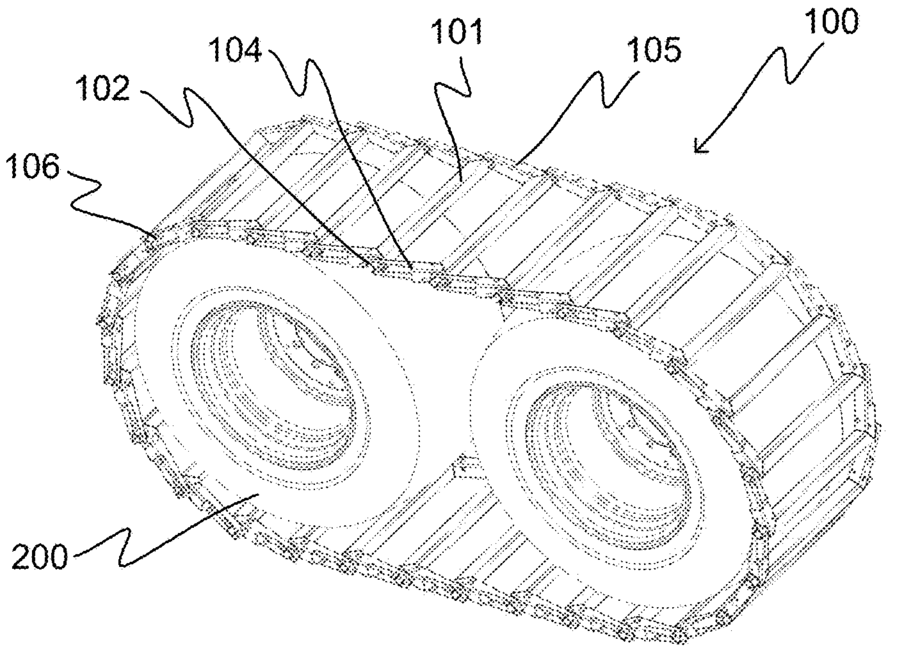
FIG. 1 illustrates a forest machine track according to a first embodiment of the invention.
Figure 2:
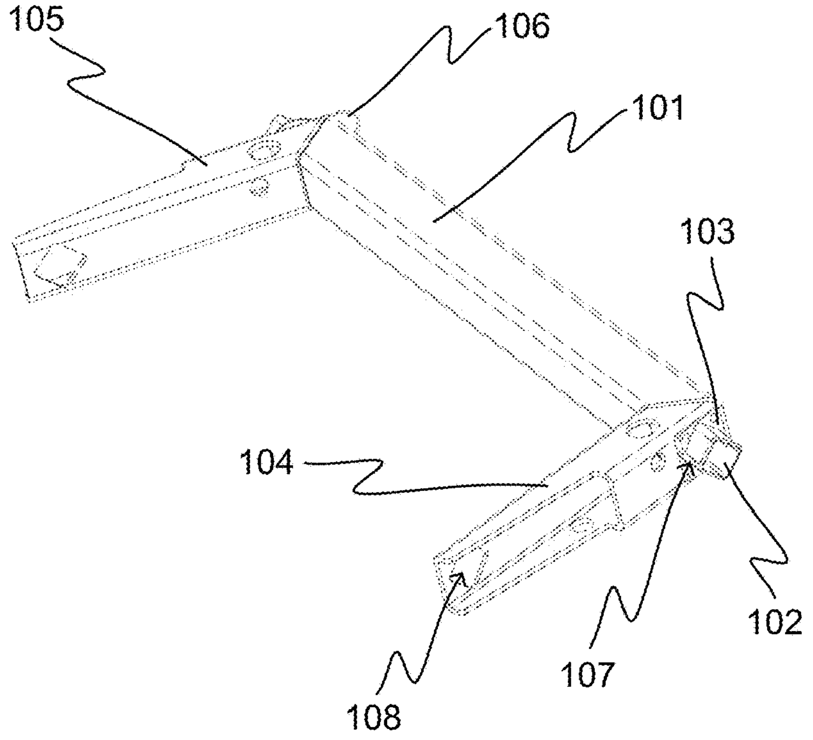
FIG. 2 illustrates a partial view of the forest machine track of FIG. 1.

FIG. 1 illustrates a forest machine track according to a first embodiment of the invention. The forest machine track 100 is a bogie track that is installed around two tyres 200 of a forest machine. FIG. 2 illustrates a partial view of the forest machine track 100.

The forest machine track 100 comprises outer tubes 101, which are arranged in parallel and spaced apart from each other. The longitudinal axis of the outer tubes 101 is perpendicular to the direction of motion of the forest machine track 100. An inner tube 102 is arranged inside each outer tube 101 in such a manner that the inner tube 102 can rotate about its longitudinal axis with respect to the outer tube 101. An elastomer element 103 is arranged between the outer tube 101 and the inner tube 102 for storing and releasing mechanical energy that is related to the rotation of the inner tube 102 with respect to the outer tube 101. At a rest position the inner tube 102 is at an angle of about 45 degrees relative to the outer tube 101.

The forest machine track 100 comprises connecting elements 104 and 105 with which the outer tubes 101 are connected to each other. The adjacent outer tubes 101 are connected to each other in such a manner that the first ends of the connecting elements 104 and 105 are connected to opposite ends of one of the adjacent outer tubes 101 and the second ends of the connecting elements 104 and 105 are connected to opposite ends of the inner tube 102 that is arranged inside the other of the adjacent outer tubes 101. The connecting elements 104 and 105 are connected to the outer tube 101 by welding. The connecting elements 104 and 105 are connected to the inner tube 102 in a releasable manner by using a pin 106 that is arranged into a transverse through-hole 107 provided in the end of the inner tube 102. The connecting elements 104 and 105 have openings 108 at both of their ends through which the ends of the inner tubes 102 are arranged to extend.

In the forest machine track 100 of FIG. 1, mechanical energy is stored into the elastomer element 103 when the connecting elements 104 and 105 that are connected to the inner tube 102 rotate the inner tube 102 away from its rest position. The stored mechanical energy can release from the elastomer element 103 to rotate the inner tube 102 towards its rest position and thus at the same time to rotate the connecting elements 104 and 105 that are connected to the inner tube 102.

Figure 3:
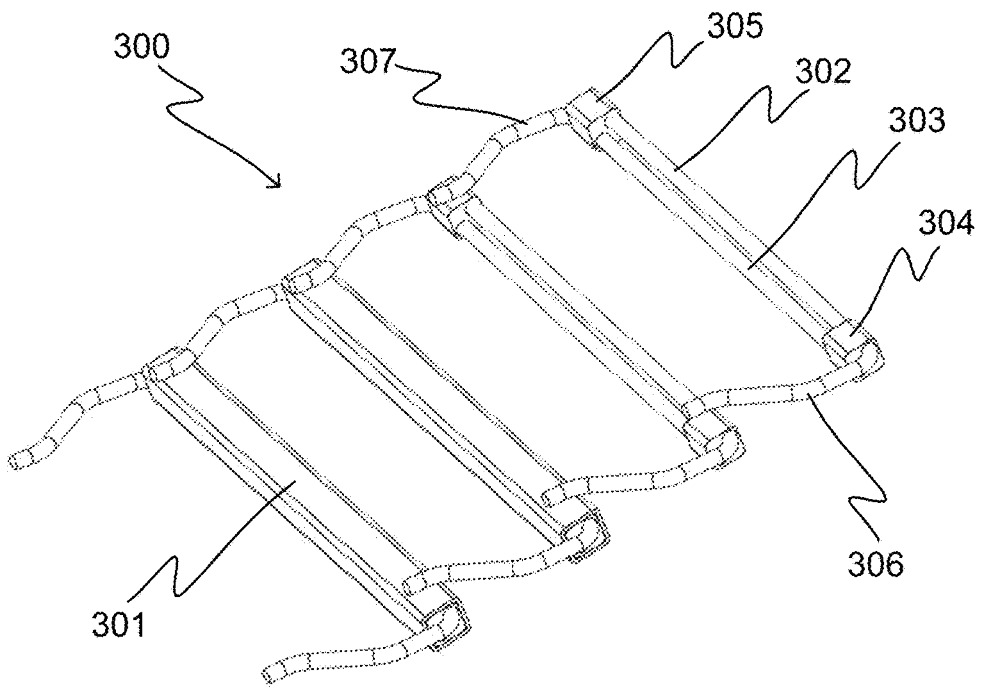
FIG. 3 illustrates a partial view of a forest machine track according to a second embodiment of the invention.

FIG. 3 illustrates a partial view of a forest machine track according to a second embodiment of the invention. The structure of the forest machine track 300 is shown partly exposed.

The forest machine track 300 comprises outer tubes 301, which are arranged in parallel and spaced apart from each other. Each outer tube 301 is provided with torsion bars 302 and 303, which are arranged side by side inside the outer tube 301. The ends of the outer tube 301 are closed by end caps 304 and 305. One end of the torsion bar 302 is arranged to extend through the end cap 304 and the other end of the torsion bar 302 is connected to the end cap 305. One end of the torsion bar 303 is arranged to extend through the end cap 305 and the other end of the torsion bar 303 is connected to the end cap 304.

The forest machine track 300 comprises connecting elements 306 and 307 with which the outer tubes 301 are connected to each other. The adjacent outer tubes 301 are connected to each other in such a manner that the first ends of the connecting elements 306 and 307 are connected to opposite ends of one of the adjacent outer tubes 301 and the second ends of the connecting elements 306 and 307 are connected, respectively, to the ends of the torsion bars 302 and 303 that are arranged inside the other of the adjacent outer tubes 301. The connecting elements 306 and 307 are connected to the outer tube 301 and to the torsion bars 302 and 303 by welding.

In the forest machine track 300 of FIG. 3, mechanical energy is stored into the torsion bars 302 and 303 when the connecting elements 306 and 307 connected to them rotate the torsion bars 302 and 303 away from their rest positions. The stored mechanical energy can release from the torsion bars 302 and 303 to rotate the connecting elements 306 and 307 in an opposite direction.

Figure 4:
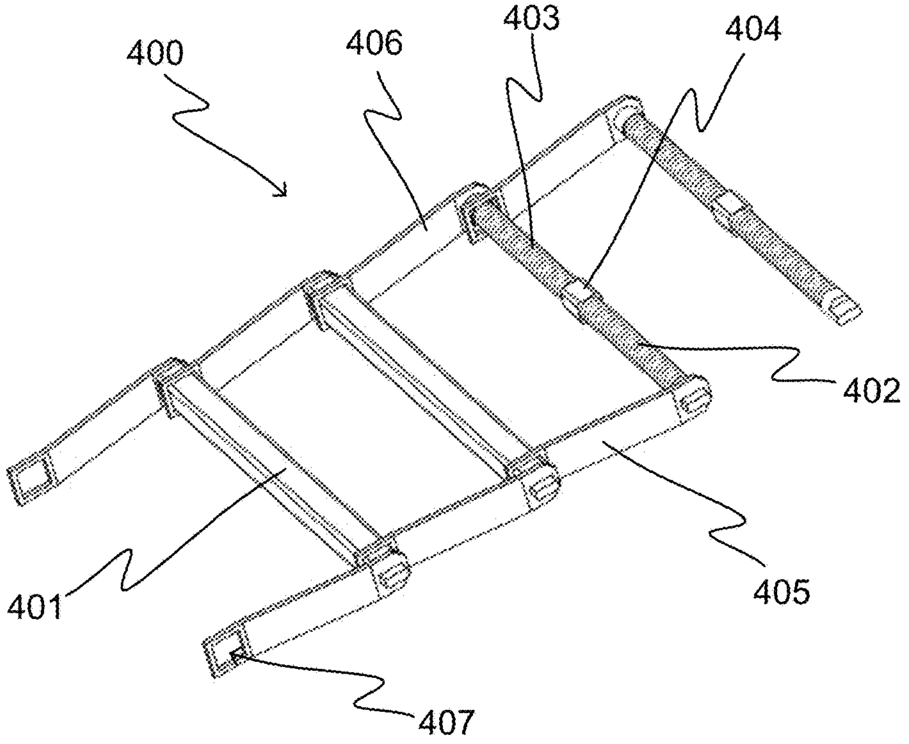
FIG. 4 illustrates a partial view of a forest machine track according to a third embodiment of the invention.

FIG. 4 illustrates a partial view of a forest machine track according to a third embodiment of the invention. The structure of the forest machine track 400 is shown partly exposed.

The forest machine track 400 comprises outer tubes 401, which are arranged in parallel and spaced apart from each other. Each outer tube 401 is provided with coil springs 402 and 403 arranged sequentially inside the outer tube 401. The coil springs 402 and 403 are connected to each other with a centre element 404.

The forest machine track 400 comprises connecting elements 405 and 406 with which the outer tubes 401 are connected to each other. The adjacent outer tubes 401 are connected to each other in such a manner that the first ends of the connecting elements 405 and 406 are connected to opposite ends of one of the adjacent outer tubes 401 and the second ends of the connecting elements 405 and 406 are connected, respectively, to the ends of the coil springs 402 and 403 that are arranged inside the other of the adjacent outer tubes 401. The connecting elements 405 and 406 are connected to the outer tube 401 and to the coil springs 402 and 403 in a releasable manner. The connecting elements 405 and 406 have openings 407 at both of their ends through which the ends of the outer tube 401 and/or the coil springs 402 and 403 are arranged to extend.

In the forest machine track 400 of FIG. 4, mechanical energy is stored into the coil springs 402 and 403 when the connecting elements 405 and 406 connected to them rotate the coil springs 402 and 403 away from their rest position. The stored mechanical energy can release from the coil springs 402 and 403 to rotate the connecting elements 405 and 406 in an opposite direction.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A forest machine track, comprising:

a plurality of connecting elements, each connecting element having a first end and a second end, wherein the forest machine track comprises:

a plurality of outer tubes arranged in parallel and spaced apart from each other, and a plurality of means for storing and releasing mechanical energy, each of the plurality of means for storing and releasing mechanical energy being arranged in connection with one of the plurality of outer tubes, and wherein adjacent outer tubes of the plurality of outer tubes are connected by two connecting elements of the plurality of connecting elements in such a manner that the first ends of the two connecting elements are connected to one of the adjacent outer tubes and the second ends of the two connecting elements are connected to the means for storing and releasing mechanical energy in connection with the other of the adjacent outer tubes.

2. The forest machine track according to claim 1, wherein the means for storing and releasing mechanical energy comprises an inner tube arranged inside the outer tube in such a manner that the inner tube can rotate about its longitudinal axis with respect to the outer tube, and at least one elastomer element arranged between the inner tube and the outer tube, and wherein ends of the inner tube are connected to the second ends of the connecting elements.

3. The forest machine track according to claim 2, wherein the outer tubes and the inner tubes are rectangular tubes.

4. The forest machine track according to claim 3, wherein the inner tube is arranged inside the outer tube in such a manner that at a rest position the inner tube is at an angle of between 35 and 55 degrees relative to the outer tube.

5. The forest machine track according to claim 2, wherein the connecting element has a first opening at the first end, through which first opening the end of the inner tube is arranged to extend.

6. The forest machine track according to claim 5, wherein the connecting element has a second opening at the second end, through which second opening the end of the inner tube is arranged to extend.

7. The forest machine track according to claim 6, wherein the first and/or second openings are rectangular-shaped.

8. The forest machine track according to claim 5, wherein the first opening is rectangular-shaped.

9. The forest machine track according to claim 1, wherein the means for storing and releasing mechanical energy comprises a first torsion bar and a second torsion bar arranged side by side inside the outer tube, wherein opposite ends of the first torsion bar and the second torsion bar are connected to the second ends of the connecting elements.

10. The forest machine track according to claim 9, wherein the connecting element has a first opening at the first end, through which first opening the end of the first torsion bar or the second torsion bar is arranged to extend.

11. The forest machine track according to claim 10, wherein the connecting element has a second opening at the second end, through which second opening the end of the first torsion bar or the second torsion bar is arranged to extend.

12. The forest machine track according to claim 1, wherein the means for storing and releasing mechanical energy comprises a first coil spring and a second coil spring arranged sequentially inside the outer tube, wherein distal ends of the first coil spring and the second coil spring are connected to the second ends of the connecting elements.

13. The forest machine track according to claim 12, wherein the connecting element has a first opening at the first end, through which first opening the end of the first coil spring or the second coil spring is arranged to extend.

14. The forest machine track according to claim 12, wherein the connecting element has a second opening at the second end, through which second opening the end of the first coil spring or the second coil spring is arranged to extend.

* * * * *